United States Patent
Zhao et al.

(10) Patent No.: US 12,132,653 B2
(45) Date of Patent: Oct. 29, 2024

(54) METHOD AND DEVICE FOR PROCESSING ROUTING TABLE ENTRIES

(71) Applicant: SUZHOU CENTEC COMMUNICATIONS CO., LTD., Jiangsu (CN)

(72) Inventors: Maocong Zhao, Jiangsu (CN); Zhichuan He, Jiangsu (CN); Wengang Wang, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 380 days.

(21) Appl. No.: 17/790,096

(22) PCT Filed: Oct. 12, 2020

(86) PCT No.: PCT/CN2020/120430
§ 371 (c)(1),
(2) Date: Jun. 29, 2022

(87) PCT Pub. No.: WO2021/135492
PCT Pub. Date: Jul. 8, 2021

(65) Prior Publication Data
US 2023/0041395 A1    Feb. 9, 2023

(30) Foreign Application Priority Data
Dec. 31, 2019  (CN) .......................... 201911419898.5

(51) Int. Cl.
*H04L 45/00*  (2022.01)
*H04L 45/745*  (2022.01)
(Continued)

(52) U.S. Cl.
CPC ............ *H04L 45/54* (2013.01); *H04L 45/745* (2013.01); *H04L 61/5007* (2022.05); *H04L 2101/659* (2022.05)

(58) Field of Classification Search
None
See application file for complete search history.

(56) References Cited

U.S. PATENT DOCUMENTS

| 6,665,297 | B1 * | 12/2003 | Hariguchi | ............... H04L 45/00 370/395.32 |
| 10,009,275 | B1 | 6/2018 | Singh | |
| 2009/0041058 | A1 | 2/2009 | Ikeda et al. | |
| 2015/0172191 | A1 * | 6/2015 | Wang | .................... H04L 45/748 370/392 |

(Continued)

FOREIGN PATENT DOCUMENTS

| CN | 101114971 A | 1/2008 |
| CN | 101695054 A | 4/2010 |

(Continued)

OTHER PUBLICATIONS

International Search Report for corresponding application PCT/CN2020/120430 filed Oct. 12, 2020; Mail date Jan. 5, 2021.

*Primary Examiner* — Kenny S Lin
(74) *Attorney, Agent, or Firm* — Samson G. Yu

(57) ABSTRACT

A method and device for processing routing table entries are provided. The method includes: determining a first portion and a second portion in a network portion of an ipv6 address and a first virtual route forwarding instance identifier corresponding to the ipv6 address, the first portion being high 32 bits of the network portion and the second portion being low 32 bits of the network portion; combining the first portion and the first virtual route forwarding instance identifier to obtain first combined information, determining a first prefix index corresponding to the first combined information, and combining the second portion and the first prefix index to obtain second combined information; and correspondingly storing the first combined information and the (Continued)

first prefix index in a first routing table as routing table entry in the first routing table, and storing the second combined information in a second routing table as routing table entry in the second routing table. The problem of waste of storage resources for ipv6 route storage in the related art is solved.

10 Claims, 3 Drawing Sheets

(51) Int. Cl.
*H04L 61/5007* (2022.01)
*H04L 101/659* (2022.01)

(56) References Cited

U.S. PATENT DOCUMENTS

| | | | |
|---|---|---|---|
| 2017/0155587 A1* | 6/2017 | Bannister | H04L 45/04 |
| 2019/0140951 A1* | 5/2019 | Hong | H04L 45/7453 |
| 2020/0036634 A1* | 1/2020 | Hong | H04L 45/745 |

FOREIGN PATENT DOCUMENTS

| | | | |
|---|---|---|---|
| CN | 102291296 A | * | 12/2011 |
| CN | 102438050 A | | 5/2012 |
| CN | 103139077 A | | 6/2013 |
| CN | 104426774 A | | 3/2015 |
| CN | 105141525 A | | 12/2015 |
| CN | 105827530 A | | 8/2016 |
| CN | 109005252 A | | 12/2018 |
| CN | 111131049 A | | 5/2020 |
| WO | 2015032214 A1 | | 3/2015 |

\* cited by examiner

METHOD AND DEVICE FOR PROCESSING ROUTING TABLE ENTRIES

The present disclosure is a national stage filing of PCT Application No. PCT/CN2020/120430 filed on Oct. 12, 2020, which claims priority to Chinese patent application No. 201911419898.5, filed on Dec. 31, 2019, and entitled "method and device for processing routing table entries", the contents of which are hereby incorporated by reference in its entirety.

TECHNICAL FIELD

The present disclosure relates to the field of communications, and in particular, to a method and device for processing routing table entries.

BACKGROUND

At present, an ipv6 technology is more and more widely applied. An ipv6 address is 128 bits, and how to plan, allocate and use the 128-bit ipv6 address is one of the problems to be solved currently. An address prefix of the ipv6 address allocated from an Internet Assigned Numbers Authority (IANA) in the Asia-Pacific region is between 19 bits and 23 bits, i.e. /19 to /23, and a prefix of an autonomous domain (also called an Autonomous System (AS)) allocated by major operators in China is between /20 to /32. For example, a commercial ipv6 of China Telecom is 240e::/20, a commercial ipv6 of China Unicom is 2408:8000::/20, and a commercial ipv6 of China Radio and Television is 240a:4000::/21. According to an ipv6 address allocation rule, an ipv6 address prefix to a provincial level is /32, a network segment address to a user-side area is /64, and each manufacturer and operator use an address of less than /64 bits for addressing allocation.

In the related art, an ipv6 route is stored mainly in the following two ways. FIG. 1 is a storage schematic diagram of an ipv6 route in the related art. In the first way, as shown in FIG. 1, since an ipv6 address is 128 bits, the ipv6 address is entirely stored in a memory, i.e. one ipv6 address needs to occupy 128 bits in the memory. FIG. 2 is a storage schematic diagram of another ipv6 route in the related art. In the second way, as shown in FIG. 2, since prefixes of ipv6 addresses allocated by various manufacturers and operators are less than 64 bits and route addressing also uses routes less than /64 bits, a 64-bit network portion in the ipv6 address is stored in a memory.

However, the above first way has the following problems. Since an ipv4 address is 32 bits, a memory occupied by storing one ipv6 address is four times of a memory occupied by one ipv4 address, thus resulting in the same memory. The table entry specification of the ipv6 address is ¼ of the table entry specification of the ipv4 address (the table entry specification represents the number of addresses (i.e. routing entries) that can be stored in a memory), and therefore the same memory is used. The number of ipv6 addresses that can be stored in the memory is ¼ of the number of ipv4 addresses that can be stored. The table entry specification of the ipv6 address is limited, and since each ipv6 address needs to occupy 128 bits, storage resources will be wasted. Meanwhile, due to the inconsistent size of ipv6 table entries and ipv4 table entries, the chip design and internal processing flow are also inconsistent, thus increasing the chip design complexity. The above second way has the following problems. A memory occupied by storing one ipv6 address is twice of a memory occupied by one ipv4 address, thus resulting in the same memory. The table entry specification of the ipv6 address is ½ of the table entry specification of the ipv4 address. Therefore, the table entry specification of the ipv6 address is limited, and since each ipv6 address needs to occupy 64 bits, storage resources will be wasted. Meanwhile, due to the inconsistent size of ipv6 table entries and ipv4 table entries, the chip design and internal processing flow are also inconsistent, thus increasing the chip design complexity.

In view of the problem of waste of storage resources for ipv6 route storage in the related art, an effective technical solution has not been proposed.

SUMMARY

Embodiments of the present disclosure provide a method and device for processing routing table entries, intended to at least solve the problem of waste of storage resources for ipv6 route storage in the related art.

According to one embodiment of the present disclosure, a method for processing routing table entries is provided, which may include the following operations.

A first portion and a second portion in a network portion of an ipv6 address and a first virtual route forwarding instance identifier corresponding to the ipv6 address are determined. The first portion is high 32 bits of the network portion and the second portion is low 32 bits of the network portion.

The first portion and the first virtual route forwarding instance identifier are combined to obtain first combined information, a first prefix index corresponding to the first combined information is determined, and the second portion and the first prefix index are combined to obtain second combined information.

The first combined information and the first prefix index are correspondingly stored in a first routing table as routing table entry in the first routing table, and the second combined information is stored in a second routing table as routing table entry in the second routing table.

Optionally, the first routing table is a first TCAM routing table, and the second routing table includes at least one of the following: a HASH routing table and a longest prefix match routing table. The longest prefix match routing table includes: a second TCAM routing table and a dictionary tree routing table. The operation that the second combined information is stored in a second routing table so as to take the second combined information as routing table entry in the second routing table includes the following operations. The second combined information is stored in the HASH routing table; or, a third portion and a fourth portion in the second portion are determined; the third portion is a common prefix of the second portion and the second portion is composed of the third portion and the fourth portion. The third portion and the first prefix index are combined to obtain third combined information, the third combined information is stored in the second TCAM routing table, and the fourth portion is stored in the dictionary tree routing table.

Optionally, after the first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table, the method may further include the following operations. A destination network address of a message and a second virtual route forwarding instance identifier corresponding to the message are acquired. The destination network address is an ipv6 address, the destination network address includes a fifth portion and a variable portion, the fifth portion is high 32 bits of the destination network address, and the variable portion is low 32 bits of the destination network address. A first keyword is formed by the fifth portion and the second virtual routing forwarding instance identifier, a matching first table entry is searched in the first routing table according to the first keyword, a second prefix index corresponding to the first table entry and a first prefix corresponding to the second prefix index are determined, and the first prefix is determined as an autonomous domain prefix of the destination network address. A second keyword is formed by the variable portion and the autonomous domain prefix, and a matching routing table entry is searched in the second routing table according to the second keyword.

Optionally, the operation that a matching routing table entry is searched in the second routing table according to the second keyword includes the following operations. A matching second table entry is searched in the HASH routing table according to the second keyword, and next hop information corresponding to the second table entry is acquired. The message is forwarded according to the next hop information corresponding to the second table entry.

Optionally, the operation that a matching routing table entry is searched in the second routing table according to the second keyword includes the following operations. A matching third table entry is searched in the second TCAM routing table according to the second keyword, a third prefix index corresponding to the third table entry and a second prefix corresponding to the third prefix index are determined, and the second prefix is determined as a prefix of the variable portion. The variable portion is composed of a prefix of the variable portion and a sixth portion, and the sixth portion is a portion of the variable portion other than the prefix of the variable portion. A matching fourth table entry is searched in the dictionary tree routing table according to the prefix of the variable portion and the sixth portion, and next hop information corresponding to the fourth table entry is determined. The message is forwarded according to the next hop information corresponding to the fourth table entry.

According to another embodiment of the present disclosure, a device for processing routing table entries is provided, which may include:
- a determination module, configured to determine a first portion and a second portion in a network portion of an ipv6 address and a first virtual route forwarding instance identifier corresponding to the ipv6 address, the first portion being high 32 bits of the network portion and the second portion being low 32 bits of the network portion;
- a combination module, configured to combine the first portion and the first virtual route forwarding instance identifier to obtain first combined information, determine a first prefix index corresponding to the first combined information, and combine the second portion and the first prefix index to obtain second combined information; and
- a storage module, configured to correspondingly store the first combined information and the first prefix index in a first routing table as routing table entry in the first routing table, and store the second combined information in a second routing table as routing table entry in the second routing table.

Optionally, the first routing table is a first TCAM routing table, and the second routing table includes at least one of the following: a HASH routing table and a longest prefix match routing table. The longest prefix match routing table includes: a second TCAM routing table and a dictionary tree routing table. The storage module is further configured to: store the second combined information in the HASH routing table; or, determine a third portion and a fourth portion in the second portion, the third portion being a common prefix to the second portion and the second portion being composed of the third portion and the fourth portion; and combine the third portion and the first prefix index to obtain third combined information, store the third combined information in the second TCAM routing table, and store the fourth portion in the dictionary tree routing table.

Optionally, the device may further include: an acquisition module, configured to acquire a destination network address of a message and a second virtual route forwarding instance identifier corresponding to the message, the destination network address being an ipv6 address, the destination network address including a fifth portion and a variable portion, the fifth portion being high 32 bits of the destination network address, and the variable portion being low 32 bits of the destination network address; a first matching module, configured to form a first keyword by the fifth portion and the second virtual routing forwarding instance identifier, search for a matching first table entry in the first routing table according to the first keyword, determine a second prefix index corresponding to the first table entry and a first prefix corresponding to the second prefix index, and determine the first prefix as an autonomous domain prefix of the destination network address; and a second matching module, configured to form a second keyword by the variable portion and the autonomous domain prefix, and search for a matching routing table entry in the second routing table according to the second keyword.

Optionally, the second matching module is further configured to: search for a matching second table entry in the HASH routing table according to the second keyword, and acquire next hop information corresponding to the second table entry; and forward the message according to the next hop information corresponding to the second table entry.

Optionally, the second matching module is further configured to: search for a matching third table entry in the second TCAM routing table according to the second keyword, determine a third prefix index corresponding to the third table entry and a second prefix corresponding to the third prefix index, and determine the second prefix as a prefix of the variable portion, the variable portion being composed of the prefix of the variable portion and a sixth portion, and the sixth portion being a portion of the variable portion other than the prefix of the variable portion; search for a matching fourth table entry in the dictionary tree routing table according to the prefix of the variable portion and the sixth portion, and determine next hop information corresponding to the fourth table entry; and forward the message according to the next hop information corresponding to the fourth table entry.

Optionally, according to another embodiment of the present disclosure, a storage medium is provided. The storage medium may store a computer program therein which, when run, is configured to perform the above method.

Optionally, according to another embodiment of the present disclosure, an electronic device is provided, which may include a memory and a processor. The memory stores a computer program. The processor is configured to run the computer program to perform the above method.

By means of the present disclosure, a first portion and a second portion in a network portion of an ipv6 address and a first virtual route forwarding instance identifier corresponding to the ipv6 address are determined. The first portion is high 32 bits of the network portion and the second portion is low 32 bits of the network portion. The first portion and the first virtual route forwarding instance identifier are combined to obtain first combined information, a first prefix index corresponding to the first combined information is determined, and the second portion and the first prefix index are combined to obtain second combined information. The first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table. Therefore, the problem of waste of storage resources for ipv6 route storage in the related art can be solved, the storage resources required by an ipv6 route can be saved, and the table entry specification of the ipv6 route can be improved.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings.

DETAILED DESCRIPTION OF THE EMBODIMENTS

Figure 1:
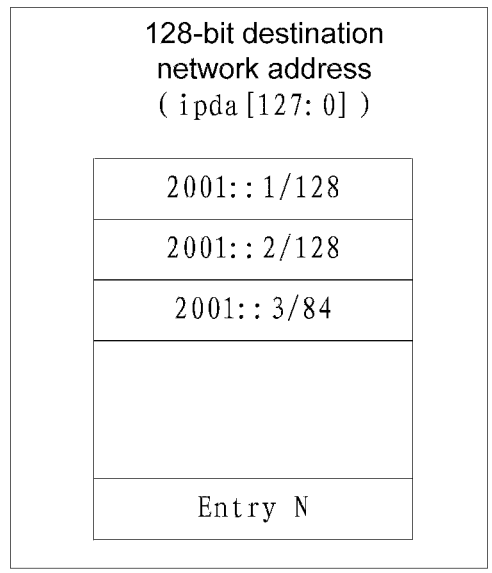
FIG. 1 is a storage schematic diagram of an ipv6 route in the related art.
Figure 2:
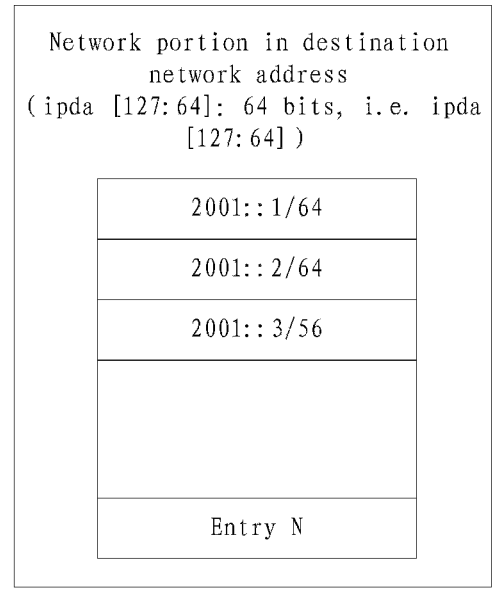
FIG. 2 is a storage schematic diagram of another ipv6 route in the related art.

The present disclosure is described below with reference to the drawings and in conjunction with the embodiments in detail. It should be noted that embodiments in the present application and features in the embodiments may be combined under the condition of no conflicts.

It should be noted that the specification and claims of the present disclosure and the terms "first", "second" and the like in the drawings are used for distinguishing between similar objects and not necessarily for describing a particular sequential or chronological order.

Technical terms in the embodiments of the present disclosure are explained as follows.

TCAM: tristate storage memory, which may perform matching using a mask;

HASH: hashing algorithm, also known as a hash algorithm;

TCAM routing table (or TCAM table): routing table stored in the TCAM;

HASH routing table: routing table for matching using the HASH algorithm.

Embodiment 1

Figure 3:
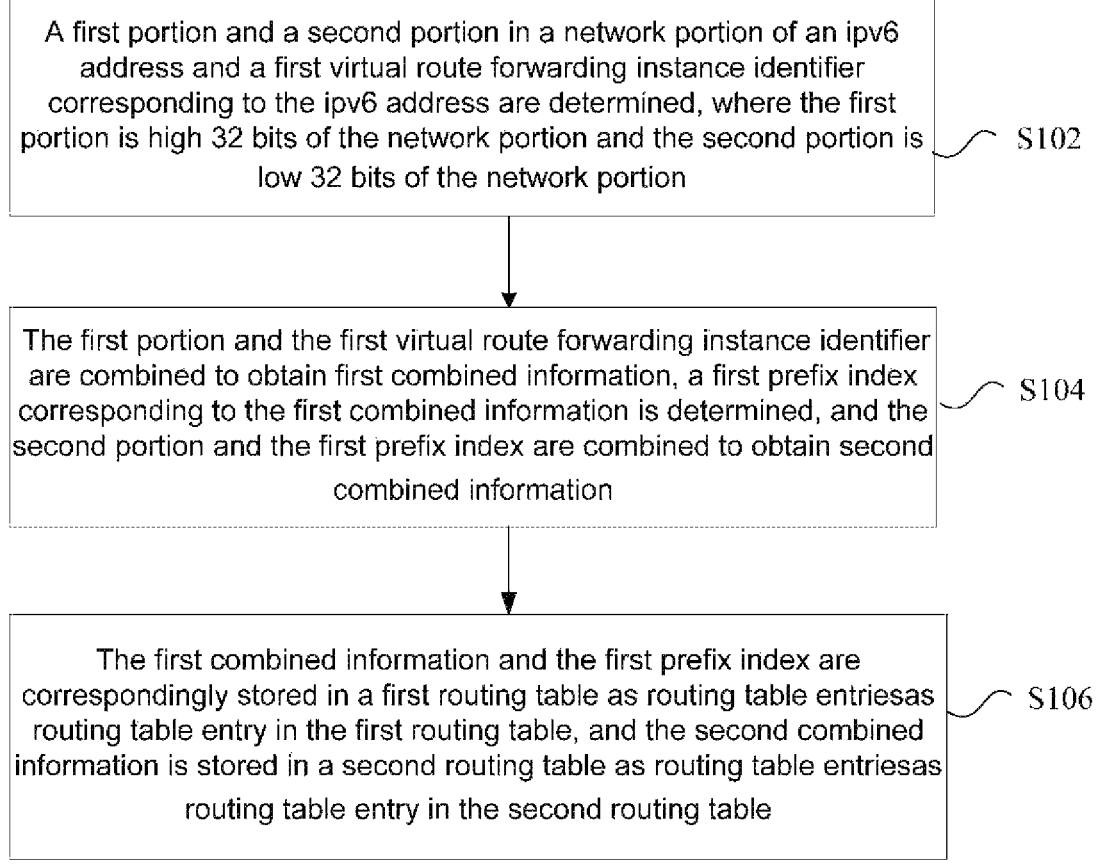
FIG. 3 is a flowchart of a method for processing routing table entries according to an embodiment of the present disclosure.

The embodiment of the present disclosure provides a method for processing routing table entries. FIG. 3 is a flowchart of a method for processing routing table entries according to an embodiment of the present disclosure. As shown in FIG. 3, the method includes the following steps.

In step S102, a first portion and a second portion in a network portion of an ipv6 address and a first virtual route forwarding instance identifier corresponding to the ipv6 address are determined. The first portion is high 32 bits of the network portion and the second portion is low 32 bits of the network portion.

Optionally, the ipv6 address is composed of a network portion including a site prefix and a subnet ID and a node portion including an interface ID.

In step S104, the first portion and the first virtual route forwarding instance identifier are combined to obtain first combined information, a first prefix index corresponding to the first combined information is determined, and the second portion and the first prefix index are combined to obtain second combined information.

In step S106, the first combined information and the first prefix index are correspondingly stored in a first routing table as routing table entry in the first routing table, and the second combined information is stored in a second routing table as routing table entry in the second routing table.

By means of the present disclosure, a first portion and a second portion in a network portion of an ipv6 address and a first virtual route forwarding instance identifier corresponding to the ipv6 address are determined. The first portion is high 32 bits of the network portion and the second portion is low 32 bits of the network portion. The first portion and the first virtual route forwarding instance identifier are combined to obtain first combined information, a first prefix index corresponding to the first combined information is determined, and the second portion and the first prefix index are combined to obtain second combined information. The first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table. Therefore, the problem of waste of storage resources for ipv6 route storage in the related art can be solved, the storage resources required by an ipv6 route can be saved, and the table entry specification of the ipv6 route can be improved.

It should be noted that in the above embodiment, it is considered that a forwarding device (e.g. a router) will typically route within only a few or only one autonomous domain, such that the forwarding device stores routing table entries for which most ipv6 addresses have the same autonomous domain common prefix. Based on the above embodiment, the network portion of the ipv6 address is split, i.e. into high 32 bits and low 32 bits, and the high 32 bits and a corresponding virtual route forwarding instance identifier are stored in a first routing table, so that the same portion of the pv6 address is stored, thereby avoiding the waste of storage resources caused by storing each ipv6 address respectively. Optionally, the second routing table may be a conventional routing table, such as a HASH table, a TCAM table (i.e. a TCAM routing table) and a dictionary tree routing table. Thus, when the second routing table is used for table lookup, the route lookup is consistent with the route lookup of the conventional routing table (e.g. consistent with the route lookup of ipv4). Based on the above embodiment, the chip design and the internal processing flow of the chip are simplified, and the specification consistency of address processing is achieved.

In an optional embodiment of the present disclosure, the first routing table is a first TCAM routing table, and the second routing table includes at least one of the following: a HASH routing table and a longest prefix match routing table. The longest prefix match routing table includes: a second TCAM routing table and a dictionary tree routing table. The operation that the second combined information is stored in a second routing table so as to take the second combined information as routing table entry in the second routing table includes the following operations. The second combined information is stored in the HASH routing table; or, a third portion and a fourth portion in the second portion are determined. The third portion is a common prefix to the second portion and the second portion is composed of the third portion and the fourth portion. The third portion and the first prefix index are combined to obtain third combined information, the third combined information is stored in the second TCAM routing table, and the fourth portion is stored in the dictionary tree routing table.

Optionally, in the above embodiment, the second combined information may be stored in the HASH routing table, e.g. for 64-bit host routing (i.e. /64-bit host routing). Based on the above embodiment, considering that the second portion may also have a common prefix, the second portion is further split. For example, for a longest prefix match routing table, the second portion may be further split into a third portion and a fourth portion. The third portion is a common prefix possessed by the second portion, and the third portion and a corresponding prefix index are stored in a second TCAM routing table to further save storage resources, thereby further improving the table entry specification of the ipv6 address.

In an optional embodiment of the present disclosure, after the first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table, the method further includes the following operations. A destination network address of a message and a second virtual route forwarding instance identifier corresponding to the message are acquired. The destination network address is an ipv6 address, the destination network address includes a fifth portion and a variable portion, the fifth portion is high 32 bits of the destination network address, and the variable portion is low 32 bits of the destination network address. A first keyword is formed by the fifth portion and the second virtual routing forwarding instance identifier, a matching first table entry is searched in the first routing table according to the first keyword, a second prefix index corresponding to the first table entry and a first prefix corresponding to the second prefix index are determined, and the first prefix is determined as an autonomous domain prefix of the destination network address. A second keyword is formed by the variable portion and the autonomous domain prefix, and a matching routing table entry is searched in the second routing table according to the second keyword.

Optionally, the destination network address is composed of a network portion including a site prefix and a subnet ID and a node portion including an interface ID. It should be noted that in the above embodiment, a second prefix index corresponding to the first table entry and a first prefix corresponding to the second prefix index are determined, and the first prefix is determined as an autonomous domain prefix of the destination network address, i.e. the first prefix corresponding to the second prefix index is taken as an autonomous domain prefix of the destination network address.

In the above embodiment, when routing a message, a network portion in a destination network address of the message is also split, i.e. into high 32 bits and low 32 bits.

In an optional embodiment of the present disclosure, the operation that a matching routing table entry is searched in the second routing table according to the second keyword includes the following operations. A matching second table entry is searched in the HASH routing table according to the second keyword, and next hop information corresponding to the second table entry is acquired. The message is forwarded according to the next hop information.

In an optional embodiment of the present disclosure, the operation that a matching routing table entry is searched in the second routing table according to the second keyword includes the following operations. A matching third table entry is searched in the second TCAM routing table according to the second keyword, a third prefix index corresponding to the third table entry and a second prefix corresponding to the third prefix index are determined, and the second prefix is determined as a prefix of the variable portion. The variable portion is composed of the prefix of the variable portion and a sixth portion, and the sixth portion is a portion of the variable portion other than the prefix of the variable portion. A matching fourth table entry is searched in the dictionary tree routing table according to the prefix of the variable portion and the sixth portion, and next hop information corresponding to the fourth table entry is determined. The message is forwarded according to the next hop information.

It should be noted that a third prefix index corresponding to the third table entry and a second prefix corresponding to the third prefix index are determined, and the second prefix is determined as a prefix of the variable portion, i.e. the second prefix corresponding to the third prefix index is taken as a prefix of the variable portion.

Figure 4:
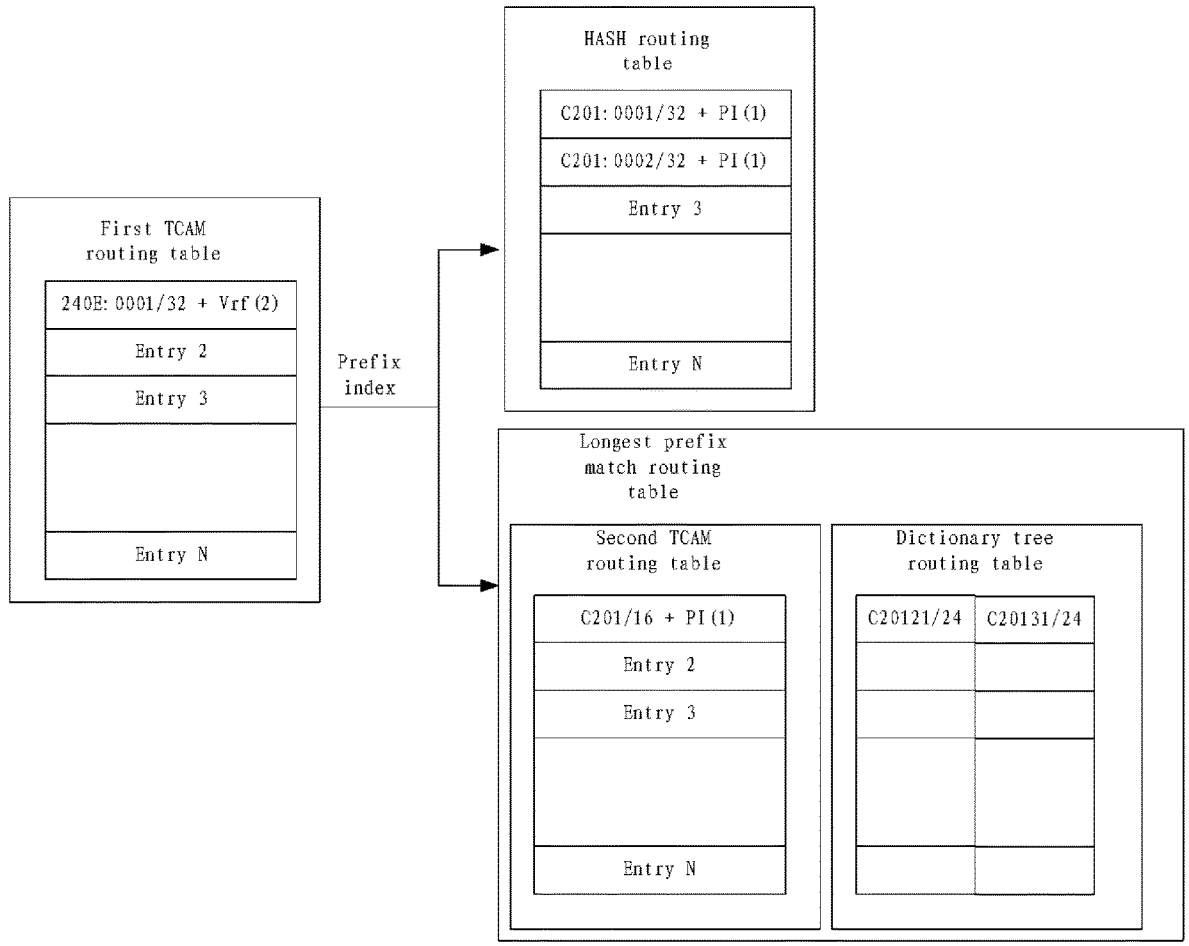
FIG. 4 is a schematic diagram of a method for processing routing table entries according to an embodiment of the present disclosure.

The above method for processing routing table entries is explained below in connection with an example, but is not intended to limit the technical solution of the embodiment of the present disclosure. FIG. 4 is a schematic diagram of a method for processing routing table entries according to an embodiment of the present disclosure. Hereinafter, an exemplary technical solution of the present disclosure will be described in detail with reference to the flowchart shown in FIG. 4. The exemplary technical solution of the present disclosure is as follows:

An ipv6 route includes a /64-bit host route and a longest prefix match route, such that for the following ipv6 routing table entries to be stored:

Host route: 240E: 0001:C201: 0001/64+VRF (2) (where VRF (2) represents that a virtual route forwarding instance identifier is 2);

Host route: 240E: 0001:C201: 0002/64+VRF (2)

Longest prefix match route: 240E: 0001:C201: 2103/56+ VRF (2)

Longest prefix match route: 240E: 0001:C201: 3103/56+ VRF (2)

In step 1, it is determined that the four routing table entries have a common autonomous domain prefix, i.e. high 32 bits (240E: 0001). As shown in FIG. 4, the high 32 bits (240E: 0001) and VRF (2) are stored in a first routing table as an entry in the first routing table, and a first prefix index corresponding to the entry is allocated as 1, i.e. the above entry and a corresponding relationship between the above entry and the first prefix index are stored in the first routing table.

In step 2, for the host routes 240E: 0001:C201: 0001/64 and 240E: 0001:C201: 0002/64, the last 32 bits and the first prefix index are stored in a second routing table (e.g. a HASH table). As shown in FIG. 4, in the HASH table, information obtained by combining the last 32 bits (i.e. C201: 0001, C201: 0002) and a corresponding first prefix index (i.e. PI (1)) is taken as an entry.

In step 3, for the longest prefix match routes 240E: 0001:C201: 2103/56 and 240E: 0001:C201: 3103/56, it is determined that the last 32 bits (i.e. C201: 2103, and C201: 3103) have a common prefix of C201. Therefore, the determined common prefix C201 and the first prefix index are stored in a second TCAM routing table, and a portion (i.e. 2103, 3103) of the last 32 bits of each longest prefix match route other than the common prefix is stored in a dictionary tree routing table (i.e. a Trie routing table). As shown in FIG. 4, the longest prefix match routing table is composed of the second TCAM routing table and the dictionary tree routing table. The dictionary tree routing table may be stored in a Random Access Memory (RAM).

It should be noted that in the above embodiment, the longest prefix match routing table is formed by using the second TCAM routing table and the dictionary tree routing table stored in the RAM, thereby saving costs due to the lower cost of the RAM.

Based on the above embodiment, when a message is routed, the message is routed by the following technical solution.

The processing flow of a /64-bit host routing message is as follow. Firstly, a high 32 bits address in a 128-bit destination network address (i.e. an ipda address) in a message is extracted as ipda [127:96] (i.e. an address between 127 bits and 96 bits in ipda), and a vrf identifier corresponding to the message (expressed as vrf [15:0], i.e. vrf has 16 bits) is determined. ipda [127:96] and vrf [15:0] together form a keyword (i.e. key) to look up a first TCAM routing table to obtain a first prefix, i.e. prefix [15:0] (indicating that a prefix has 16 bits). The prefix and ipda [95:64] (i.e. an address located between 95 bits and 64 bits in ipda, i.e. the last 32 bits of a network portion) form a key to look up a HASH table to find a result (i.e. next hop information, such as an egress), and the message is forwarded according to the next hop information.

The processing flow of a /64-bit longest prefix match message is as follows.

A high 32 bits address in a 128-bit ipda address in a message is extracted as ipda [127:96], ipda [127:96] and vrf [15:0] together form a key to look up a first TCAM routing table to obtain a first prefix, i.e. prefix [15:0], and prefix and ipda [95:64] form a key to look up a longest match routing table. Specifically, since the longest match routing table is composed of a second TCAM routing table and a dictionary tree routing table, prefix and ipda [95:64] form a key to look up the longest match routing table, including: according to the key formed by prefix and ipda [95:64], a second TCAM table is looked up to obtain a second prefix, a key is formed according to the second prefix and a portion of ipda [95:64] other than the common prefix to loop up the dictionary tree routing table to obtain next hop information, and the message is forwarded according to the next hop information.

Through the description of the above implementations, those skilled in the art may clearly understand that the method according to the above embodiment may be implemented by means of software and a necessary general hardware platform, and of course, may also be implemented through hardware, but in many cases, the former is a better implementation. Based on such understanding, the technical solution of the present disclosure, which is essential or contributes to the conventional art, may be embodied in the form of a software product stored in a storage medium (such as a Read-Only Memory (ROM)/RAM, a magnetic disk and an optical disc), including a number of instructions for causing a terminal device (which may be a mobile phone, a computer, a server, or a network device, etc.) to perform the methods described in various embodiments of the present disclosure.

Embodiment 2

According to another embodiment of the present disclosure, a device for processing routing table entries is provided, which is configured to implement the above embodiments and preferred implementations, and the description thereof has been omitted. As used below, the term "module" may implement a combination of software and/or hardware of a predetermined function. Although the apparatus described in the following embodiments is preferably implemented by software, hardware or a combination of software and hardware is also possible and conceived.

Figure 5:
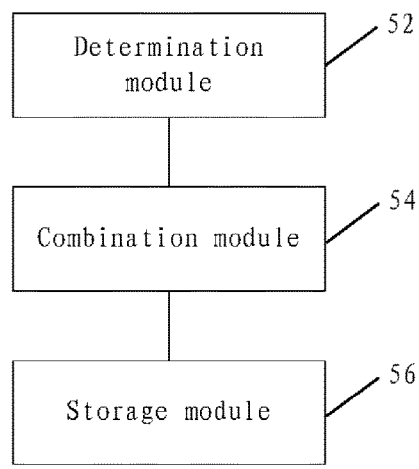
FIG. 5 is a structural block diagram of a device for processing routing table entries according to an embodiment of the present disclosure.

FIG. 5 is a structural block diagram of a device for processing routing table entries according to an embodiment of the present disclosure. As shown in FIG. 5, the device includes: a determination module 52, a combination module 54 and a storage module 56.

The determination module 52 is configured to determine a first portion and a second portion in a network portion of an ipv6 address and a first virtual route forwarding instance identifier corresponding to the ipv6 address. The first portion is high 32 bits of the network portion and the second portion is low 32 bits of the network portion.

The combination module 54 is configured to combine the first portion and the first virtual route forwarding instance identifier to obtain first combined information, determine a first prefix index corresponding to the first combined information, and combine the second portion and the first prefix index to obtain second combined information.

The storage module 56 is configured to correspondingly store the first combined information and the first prefix index in a first routing table as routing table entry in the first routing table, and store the second combined information in a second routing table as routing table entry in the second routing table.

By means of the present disclosure, a first portion and a second portion in a network portion of an ipv6 address and a first virtual route forwarding instance identifier corresponding to the ipv6 address are determined. The first portion is high 32 bits of the network portion and the second portion is low 32 bits of the network portion. The first portion and the first virtual route forwarding instance identifier are combined to obtain first combined information, a first prefix index corresponding to the first combined information is determined, and the second portion and the first prefix index are combined to obtain second combined information. The first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table. Therefore, the problem of waste of storage resources for ipv6 route storage in the related art can be solved, the storage resources required by an ipv6 route can be saved, and the table entry specification of the ipv6 route can be improved.

In an optional embodiment of the present disclosure, the first routing table is a first TCAM routing table, and the second routing table includes at least one of the following: a HASH routing table and a longest prefix match routing table. The longest prefix match routing table includes: a second TCAM routing table and a dictionary tree routing table. The storage module 56 is further configured to: store the second combined information in the HASH routing table; or, determine a third portion and a fourth portion in the second portion, the third portion being a common prefix to the second portion and the second portion being composed of the third portion and the fourth portion; and combine the third portion and the first prefix index to obtain third combined information, store the third combined information in the second TCAM routing table, and store the fourth portion in the dictionary tree routing table.

In an optional embodiment of the present disclosure, the device further includes: an acquisition module, configured to acquire a destination network address of a message and a second virtual route forwarding instance identifier corresponding to the message, the destination network address being an ipv6 address, the destination network address including a fifth portion and a variable portion, the fifth portion being high 32 bits of the destination network address, and the variable portion being low 32 bits of the destination network address; a first matching module, configured to form a first keyword by the fifth portion and the second virtual routing forwarding instance identifier, search for a matching first table entry in the first routing table according to the first keyword, determine a second prefix index corresponding to the first table entry and a first prefix corresponding to the second prefix index, and determine the first prefix as an autonomous domain prefix of the destination network address; and a second matching module, configured to form a second keyword by the variable portion and the autonomous domain prefix, and search for a matching routing table entry in the second routing table according to the second keyword.

In an optional embodiment of the present disclosure, the second matching module is further configured to: search for a matching second table entry in the HASH routing table according to the second keyword, and acquire next hop information corresponding to the second table entry; and forward the message according to the next hop information.

In an optional embodiment of the present disclosure, the second matching module is further configured to: search for a matching third table entry in the second TCAM routing table according to the second keyword, determine a third prefix index corresponding to the third table entry and a second prefix corresponding to the third prefix index, and determine the second prefix as a prefix of the variable portion, the variable portion being composed of the prefix of the variable portion and a sixth portion, and the sixth portion being a portion of the variable portion other than the prefix of the variable portion; search for a matching fourth table entry in the dictionary tree routing table according to the prefix of the variable portion and the sixth portion, and determine next hop information corresponding to the fourth table entry; and forward the message according to the next hop information.

Embodiment 3

The embodiment of the present disclosure also provides a storage medium. The storage medium includes a stored program which, when run, performs the method according to any one of the above.

Optionally, in the present embodiment, the storage medium may be configured to store a program code for performing the following steps.

At S1, a first portion and a second portion in a network portion of an ipv6 address and a first virtual route forwarding instance identifier corresponding to the ipv6 address are determined. The first portion is high 32 bits of the network portion and the second portion is low 32 bits of the network portion.

At S2, the first portion and the first virtual route forwarding instance identifier are combined to obtain first combined information, a first prefix index corresponding to the first combined information is determined, and the second portion and the first prefix index are combined to obtain second combined information.

At S3, the first combined information and the first prefix index are correspondingly stored in a first routing table as routing table entry in the first routing table, and the second combined information is stored in a second routing table as routing table entry in the second routing table.

Optionally, in the present embodiment, the storage medium may include, but is not limited to, various media capable of storing a program code such as a U disk, a ROM, a RAM, a mobile hard disk, a magnetic disk or an optical disc.

Optionally, a specific example in the present embodiment may refer to the examples described in the above embodiments and optional implementations, and details are not described herein in the present embodiment.

Embodiment 4

The embodiment of the present disclosure also provides an electronic device, which includes a memory and a processor. The memory stores a computer program. The processor is configured to run the computer program to perform the steps in any one of the above method embodiments.

Optionally, the electronic device may further include a transmission device and an input/output device, where the transmission device is connected to the processor, and the input/output device is connected to the processor.

Optionally, in the present embodiment, the processor may be configured to perform the following steps through the computer program.

At S1, a first portion and a second portion in a network portion of an ipv6 address and a first virtual route forwarding instance identifier corresponding to the ipv6 address are determined. The first portion is high 32 bits of the network portion and the second portion is low 32 bits of the network portion.

At S2, the first portion and the first virtual route forwarding instance identifier are combined to obtain first combined information, a first prefix index corresponding to the first combined information is determined, and the second portion and the first prefix index are combined to obtain second combined information.

At S3, the first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table.

Optionally, a specific example in the present embodiment may refer to the examples described in the above embodiments and optional implementations, and details are not described herein in the present embodiment.

It is apparent that those skilled in the art should understand that the above modules or steps of the present disclosure may be implemented by a general-purpose computing device, and they may be centralized on a single computing device or distributed on a network composed of multiple computing devices. They may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure should fall within the protection scope of the present disclosure.

INDUSTRIAL APPLICABILITY

By means of the present disclosure, a first portion and a second portion in a network portion of an ipv6 address and a first virtual route forwarding instance identifier corresponding to the ipv6 address are determined. The first portion is high 32 bits of the network portion and the second portion is low 32 bits of the network portion. The first portion and the first virtual route forwarding instance identifier are combined to obtain first combined information, a first prefix index corresponding to the first combined information is determined, and the second portion and the first prefix index are combined to obtain second combined information. The first combined information and the first prefix index are correspondingly stored in a first routing table so as to take the first combined information and the first prefix index as routing table entry in the first routing table, and the second combined information is stored in a second routing table so as to take the second combined information as routing table entry in the second routing table. Therefore, the problem of waste of storage resources for ipv6 route storage in the related art can be solved, the storage resources required by an ipv6 route can be saved, and the table entry specification of the ipv6 route can be improved.

The invention claimed is:

1. A method for processing routing table entries, comprising:
   determining a first portion and a second portion in a network portion of an internet protocol version 6 (ipv6) address, and a first virtual route forwarding instance identifier corresponding to the ipv6 address, wherein the first portion is high 32 bits of the network portion and the second portion is low 32 bits of the network portion;
   combining the first portion and the first virtual route forwarding instance identifier to obtain first combined information, determining a first prefix index corresponding to the first combined information, and combining the second portion and the first prefix index to obtain second combined information; and
   correspondingly storing the first combined information and the first prefix index in a first routing table as routing table entry in the first routing table, and storing the second combined information in a second routing table as routing table entry in the second routing table.

2. The method according to claim 1, wherein the first routing table is a first ternary content addressable memory (TCAM) routing table, and the second routing table comprises at least one of the following: a HASH routing table and a longest prefix match routing table, the longest prefix match routing table comprising: a second TCAM routing table and a dictionary tree routing table;
   storing the second combined information in the second routing table so as to take the second combined information as routing table entry in the second routing table comprises:
   storing the second combined information in the HASH routing table; or,
   determining a third portion and a fourth portion in the second portion, wherein the third portion is a common prefix of the second portion and the second portion is composed of the third portion and the fourth portion; combining the third portion and the first prefix index to obtain third combined information, storing the third combined information in the second TCAM routing table, and storing the fourth portion in the dictionary tree routing table.

3. The method according to claim 2, wherein after correspondingly storing the first combined information and the first prefix index in the first routing table so as to take the first combined information and the first prefix index as routing table entry in the first routing table, and storing the second combined information in the second routing table so as to take the second combined information as routing table entry in the second routing table, the method further comprises:
   acquiring a destination network address of a message and a second virtual route forwarding instance identifier corresponding to the message, wherein the destination network address is an ipv6 address, the destination network address comprises a fifth portion and a variable portion, the fifth portion is high 32 bits of the destination network address, and the variable portion is low 32 bits of the destination network address;
   forming a first keyword by the fifth portion and the second virtual routing forwarding instance identifier, searching for a matching first table entry in the first routing table according to the first keyword, determining a second prefix index corresponding to the first table entry and a first prefix corresponding to the second prefix index, and determining the first prefix as an autonomous domain prefix of the destination network address; and
   forming a second keyword by the variable portion and the autonomous domain prefix, and searching for a matching routing table entry in the second routing table according to the second keyword.

4. The method according to claim 3, wherein searching for the matching routing table entry in the second routing table according to the second keyword comprises:

searching for a matching second table entry in the HASH routing table according to the second keyword, and acquiring next hop information corresponding to the second table entry; and forwarding the message according to the next hop information corresponding to the second table entry.

5. The method according to claim 3, wherein searching for the matching routing table entry in the second routing table according to the second keyword comprises:

searching for a matching third table entry in the second TCAM routing table according to the second keyword, determining a third prefix index corresponding to the third table entry and a second prefix corresponding to the third prefix index, and determining the second prefix as a prefix of the variable portion, wherein the variable portion is composed of a prefix of the variable portion and a sixth portion, and the sixth portion is a portion of the variable portion other than the prefix of the variable portion;

searching for a matching fourth table entry in the dictionary tree routing table according to the prefix of the variable portion and the sixth portion, and determining next hop information corresponding to the fourth table entry; and forwarding the message according to the next hop information corresponding to the fourth table entry.

6. A device for processing routing table entries, comprising:

a determination module, configured to determine a first portion and a second portion in a network portion of an internet protocol version 6 (ipv6) address and a first virtual route forwarding instance identifier corresponding to the ipv6 address, the first portion is high 32 bits of the network portion and the second portion is low 32 bits of the network portion;

a combination module, configured to combine the first portion and the first virtual route forwarding instance identifier to obtain first combined information, determine a first prefix index corresponding to the first combined information, and combine the second portion and the first prefix index to obtain second combined information; and a storage module, configured to correspondingly store the first combined information and the first prefix index in a first routing table as routing table entry in the first routing table, and store the second combined information in a second routing table as routing table entry in the second routing table.

7. The device according to claim 6, wherein the first routing table is a first TCAM routing table, and the second routing table comprises at least one of the following: a HASH routing table and a longest prefix match routing table, the longest prefix match routing table comprising: a second TCAM routing table and a dictionary tree routing table;

the storage module is further configured to:
store the second combined information in the HASH routing table; or, determine a third portion and a fourth portion in the second portion, wherein the third portion is a common prefix of the second portion and the second portion is composed of the third portion and the fourth portion; and combine the third portion and the first prefix index to obtain third combined information, store the third combined information in the second TCAM routing table, and store the fourth portion in the dictionary tree routing table.

8. The device according to claim 7, further comprising:

an acquisition module, configured to acquire a destination network address of a message and a second virtual route forwarding instance identifier corresponding to the message, wherein the destination network address is an ipv6 address, the destination network address comprises a fifth portion and a variable portion, the fifth portion is high 32 bits of the destination network address, and the variable portion is low 32 bits of the destination network address;

a first matching module, configured to form a first keyword by the fifth portion and the second virtual routing forwarding instance identifier, search for a matching first table entry in the first routing table according to the first keyword, determine a second prefix index corresponding to the first table entry and a first prefix corresponding to the second prefix index, and determine the first prefix as an autonomous domain prefix of the destination network address; and a second matching module, configured to form a second keyword by the variable portion and the autonomous domain prefix, and search for a matching routing table entry in the second routing table according to the second keyword.

9. The device according to claim 8, wherein the second matching module is further configured to:

search for a matching second table entry in the HASH routing table according to the second keyword, and acquire next hop information corresponding to the second table entry; and forward the message according to the next hop information corresponding to the second table entry.

10. The device according to claim 8, wherein the second matching module is further configured to:

search for a matching third table entry in the second TCAM routing table according to the second keyword, determine a third prefix index corresponding to the third table entry and a second prefix corresponding to the third prefix index, and determine the second prefix as a prefix of the variable portion, wherein the variable portion is composed of a prefix of the variable portion and a sixth portion, and the sixth portion is a portion of the variable portion other than the prefix of the variable portion;

search for a matching fourth table entry in the dictionary tree routing table according to the prefix of the variable portion and the sixth portion, and determine next hop information corresponding to the fourth table entry; and forward the message according to the next hop information corresponding to the fourth table entry.

* * * * *